(12) United States Patent
Ahlers et al.

(10) Patent No.: US 8,877,314 B2
(45) Date of Patent: Nov. 4, 2014

(54) INSULATION CASSETTE FOR THE HEAT INSULATION OF ELONGATED ELEMENTS

(75) Inventors: Günther Ahlers, Bremen (DE); Rainer Blocksdorff, Ritterhude (DE); Peter Fahrenholz, Bremen (DE); Michael Chrobok, Bremen (DE); Peter Nowakowski, Bremen (DE)

(73) Assignee: KAEFER Isoliertechnik GmbH & Co. KG, Bremen (DE)

( * ) Notice: Subject to any disclaimer, the term of this patent is extended or adjusted under 35 U.S.C. 154(b) by 245 days.

(21) Appl. No.: 13/416,382

(22) Filed: Mar. 9, 2012

(65) Prior Publication Data

US 2012/0231185 A1 Sep. 13, 2012

(30) Foreign Application Priority Data

Mar. 10, 2011 (DE) .................. 10 2011 001 208
Mar. 16, 2011 (DE) .................. 10 2011 001 335

(51) Int. Cl.
| | |
|---|---|
| *F16L 59/08* | (2006.01) |
| *F16L 59/16* | (2006.01) |
| *F16L 27/12* | (2006.01) |
| *F16L 59/21* | (2006.01) |

(52) U.S. Cl.
CPC ............. *F16L 59/08* (2013.01); *F16L 59/163* (2013.01); *F16L 59/161* (2013.01); *F16L 27/12* (2013.01); *F16L 59/21* (2013.01)

USPC ...... 428/57; 428/591; 428/99; 976/DIG. 163; 376/289

(58) Field of Classification Search
CPC ...................................................... F16L 27/12
USPC .............. 428/58, 61, 99, 591, 57, 5; 138/149; 976/DIG. 163; 376/289
See application file for complete search history.

(56) References Cited

U.S. PATENT DOCUMENTS

| | | | |
|---|---|---|---|
| 3,892,261 A | | 7/1975 | Hoeman |
| 3,904,379 A | * | 9/1975 | Oser et al. ............ 428/591 |
| 4,659,601 A | | 4/1987 | Elliott et al. |

FOREIGN PATENT DOCUMENTS

| | | |
|---|---|---|
| DE | 23 61 036 A1 | 8/1974 |
| DE | 25 21 136 A1 | 12/1975 |
| DE | 36 36 341 A1 | 4/1988 |
| EP | 0 033 487 A1 | 8/1981 |
| EP | 0 155 148 A1 | 9/1985 |

\* cited by examiner

*Primary Examiner* — Alexander Thomas
(74) *Attorney, Agent, or Firm* — McGlew and Tuttle, P.C.

(57) ABSTRACT

Length adjustment can be performed in a simple manner and without impairment of the insulating effect in an insulation cassette for the heat insulation of elongated elements. A multilayer insulation includes flat reflection elements (21, 22). Each layer of the insulation has at least two of the flat reflection elements (21, 22), which overlap at least partly at their ends (24) facing each other.

20 Claims, 7 Drawing Sheets

INSULATION CASSETTE FOR THE HEAT INSULATION OF ELONGATED ELEMENTS

CROSS REFERENCE TO RELATED APPLICATIONS

This application claims the benefit of priority under 35 U.S.C. §119 of German Patent Application DE 10 2011 001 208.7 filed Mar. 10, 2011 and German Patent Application DE 10 2011 001 335.0 filed Mar. 16, 2011, the entire contents of each of which are incorporated herein by reference.

FIELD OF THE INVENTION

The present invention pertains to an insulation cassette for the heat insulation of elongated elements with a multilayer insulation made of flat reflection elements, wherein each layer of the insulation has at least two flat reflection elements, which overlap at least partly at their ends, a plurality of pushing guides are arranged in an overlapping area between a first cassette part and a second cassette part, and the pushing guides have an elongated hole, in which a bolt is displaceably guided.

BACKGROUND OF THE INVENTION

Such an insulation cassette is known from DE 25 21 136 A1. The bolts extends here through the inner and outer limiting plates and all reflection plates of the cassette parts.

According to the introduction to the specification for the state of the art, U.S. Pat. No. 4,659,601 A also pertains to an insulation cassette, in which a bolt passes through all layers of the insulation cassette. It is disadvantageous here that a thermal bridge is formed by the passage of the bolt from the inside of the insulation cassette through all insulation layers up to the outside.

An insulation cassette for the heat insulation of elongated elements with a multilayer insulation made of flat reflection elements is known from EP 0 033 487 A1, wherein each layer of the insulation has at least two flat reflection elements, which overlap at least partly at their ends facing each other.

Insulation cassettes, which are also called reflection metal insulation or all-metal insulation, are used for the heat insulation of pipelines. In particular, such insulation cassettes are used to insulate cooling water pipes of nuclear power plants. A good insulating effect is obtained, especially at high temperatures, because of the multilayer arrangement of the flat reflection elements consisting of reflection foils. Typical areas of application of such insulation cassettes in nuclear power plants are temperature ranges of up to about 350° C.

However, a rather substantial problem arises due to longitudinal thermal expansion because of the comparatively great temperature gradients and the all-metal design of the insulation. Moreover, the insulation cassettes can be prefabricated in an accurately fitting manner up to a certain size only, so that adapters must be made to size on site during assembly for adaptation to the actually needed lengths. For example, insulation cassettes in a stepped fold arrangement are therefore used to compensate the longitudinal thermal expansion in order to make possible a necessary longitudinal expansion. However, the problem with these stepped fold cassettes is that open gaps do occur at times. These gaps are prone to trouble and, in addition, impair the quality of the insulation.

SUMMARY OF THE INVENTION

An underlying object of the present invention is therefore to provide an insulation cassette, with which length adjustments can be carried out without impairment of the insulating effect.

The object is accomplished by the bolt being rigidly connected to the shell of the second cassette part in an insulation cassette of the above-mentioned type and extending through the elongated hole associated with the first cassette part.

A displacement of the flat reflection elements of one layer relative to one another can take place in this manner in the present invention in the area of the overlap without a gap being able to open. A length adjustment is thus possible as a compensation for longitudinal thermal expansion of the material or for providing the desired length as an adapter in the area of the overlap, without the insulation properties of the insulation cassette being impaired due to the opening of gaps.

A variant of the present invention is characterized in that the flat reflection elements are metal foils, preferably foils from stainless steel, vanadium steel, especially austenitic steel. Such metal foils possess good reflection properties for radiation. In addition, stainless steel, vanadium steel, especially austenitic steel, are resistant to corrosion and resistant, and, moreover, it has a poor thermal conductivity, which improves the insulation properties. However, it is also possible to use aluminum foil if lower requirements are imposed on the material.

In a preferred embodiment of the present invention, the flat reflection elements are arranged concentrically, especially with a radial distance of 4 mm to 15 mm, preferably 6 mm to 10 mm. This concentric arrangement makes possible a plurality of layers of the flat reflection elements around a component to be insulated, especially a pipeline. A homogeneous insulation effect is obtained by maintaining uniform distances between the reflection elements.

Another embodiment of the present invention is characterized in that the flat reflection elements have spacers, preferably knobs, which are prepared especially on both sides of the reflection elements, preferably by means of controlled deformation of the reflection elements. These spacers, especially knobs, make it possible to set the distance between the reflection elements uniformly. At the same time, reflection elements that are located adjacent to each other come into contact with one another only in a punctiform manner in the area of the spacers, so that no appreciable impairment of the insulation effect occurs here relative to the surface.

It is advantageous in this connection if the reflection elements with spacers are arranged alternatingly with reflection elements without spacers such that they alternatingly follow each other. This leads to a simple design and simple assembly, because the reflection elements that are located adjacent to one another can be displaced in relation to one another for assembly. In addition, no problems can occur during assembly due to interlocking of spacers of two adjacent flat reflection elements.

Another embodiment of the present invention is characterized in that an outer shell is provided, which has a plurality of shell parts, wherein shell parts located preferably axially and/or tangentially adjacent to one another can be axially and/or tangentially displaced in relation to one another by means of a pushing guide. These shell parts, which are axially and/or tangentially displaceable in relation to one another, can cover and envelope in this manner the flat reflection elements of each layer, which are likewise displaceable axially and/or tangentially in relation to one another, so that these are well protected against damage. At the same time, a length adjustment is not hindered by this embodiment. The pushing guide may have an elongated hole and a bolt guided therein. Such a pushing guide can be manufactured in a simple manner and can be used reliably.

It is also possible for the shell parts to have quick-acting closures, especially toggle-type fasteners, for connecting the shell parts to one another and/or to axially and/or tangentially adjacent insulation cassettes. An element to be insulated, especially a pipeline, can be retrofitted with an insulation rapidly and in a simple manner with preassembled shell parts of an insulation system. In addition, the insulation system can be opened and reclosed at any time at any desired point for maintenance and repair purposes.

In an advantageous embodiment of the present invention, the second cassette part has a mount for a branching of a pipe system. A length adjustment is thus possible in a simple manner in the area of branching as well.

If the first cassette part and/or the second cassette part has a projection and/or fold for guiding the respective other cassette part on its shell, simple assembly and reliable guiding in relation to one another can be achieved in case of changes in length. It is especially advantageous in this case if the projection and/or the fold has a height that corresponds approximately to half the guide length of the pushing guide, and is especially slightly greater. Reliable guiding of the cassette parts in relation to one another is guaranteed in this manner during assembly or in case of changes in length over the entire or at least nearly the entire guide length of the pushing guide.

Another advantage of the present invention pertains to the use of an insulation cassette according to the present invention as a compensating element for compensating longitudinal thermal changes and/or as an adapter for variable length adjustment during assembly. A length adjustment can thus be performed if needed in a simple manner and without impairment of the insulation.

Another advantage of the present invention arises in connection with the use of an insulation cassette according to the present invention for insulating pipelines, especially cooling water pipes of nuclear power plants, preferably in the area of branching. Stable and durable insulation with long service life, good insulation properties and good adaptability to changes in length is obtained here.

An exemplary embodiment of the present invention will be described in more detail below on the basis of the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
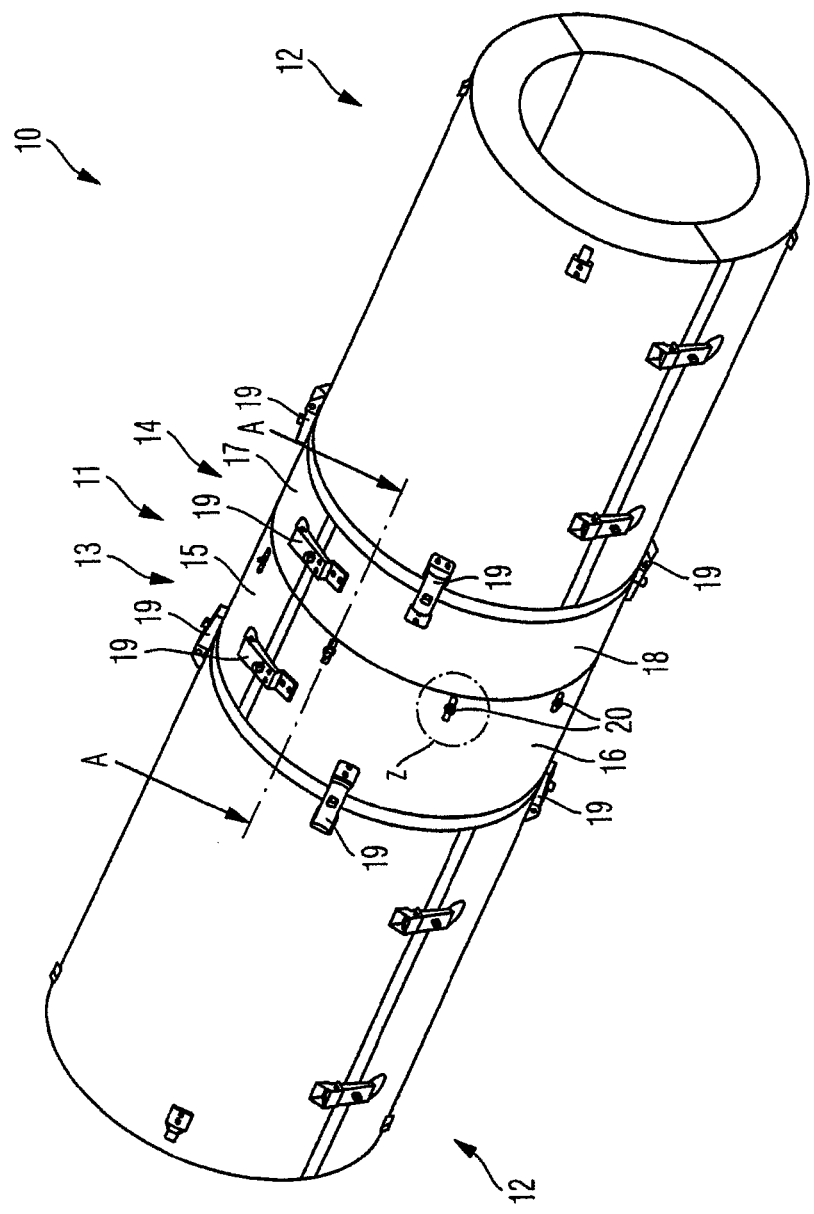
FIG. 1 is a perspective view of an insulation system with features of the present invention.

Referring to the drawings in particular, FIG. 1 shows an insulating system 10 in a perspective view as an exemplary embodiment of the present invention. As can be seen in the figure, insulation system 10 has an insulation cassette 11, adjacent to which an insulation cassette 12 each is arranged in the axial direction. The insulation cassettes 12 are prior-art all-metal insulation cassettes in the exemplary embodiment being shown, in which a multilayer insulation each, made of reflection metal foils, is arranged in a housing.

In the exemplary embodiment being shown, insulation cassette 11 has a first cassette part 13 and a second cassette part 14, which are displaceable in relation to one another in the axial direction, as will be explained in more detail below.

The first cassette part 13 has two cassette part elements 15, 16 in the exemplary embodiment being shown, whereas the second cassette part 14 has two cassette part elements 17, 18 in a similar manner.

The respective cassette part elements 15 and 16 as well as 17 and 18 are connected to one another by means of quick-acting closures, which are toggle-type fasteners in the exemplary embodiment being shown. The cassette part elements 15 through 18 are connected to the adjoining insulation cassettes 12 in the same manner, likewise by means of quick-acting closures, namely, by means of toggle-type fasteners 19.

In addition, it can be determined from the figure that a plurality of pushing guides 20 are arranged in an overlapping area between the first cassette part 13 and the second cassette part 14. A total of four pushing guides can be seen in the figure, but only two of these pushing guides are provided with a reference number.

Figure 2:
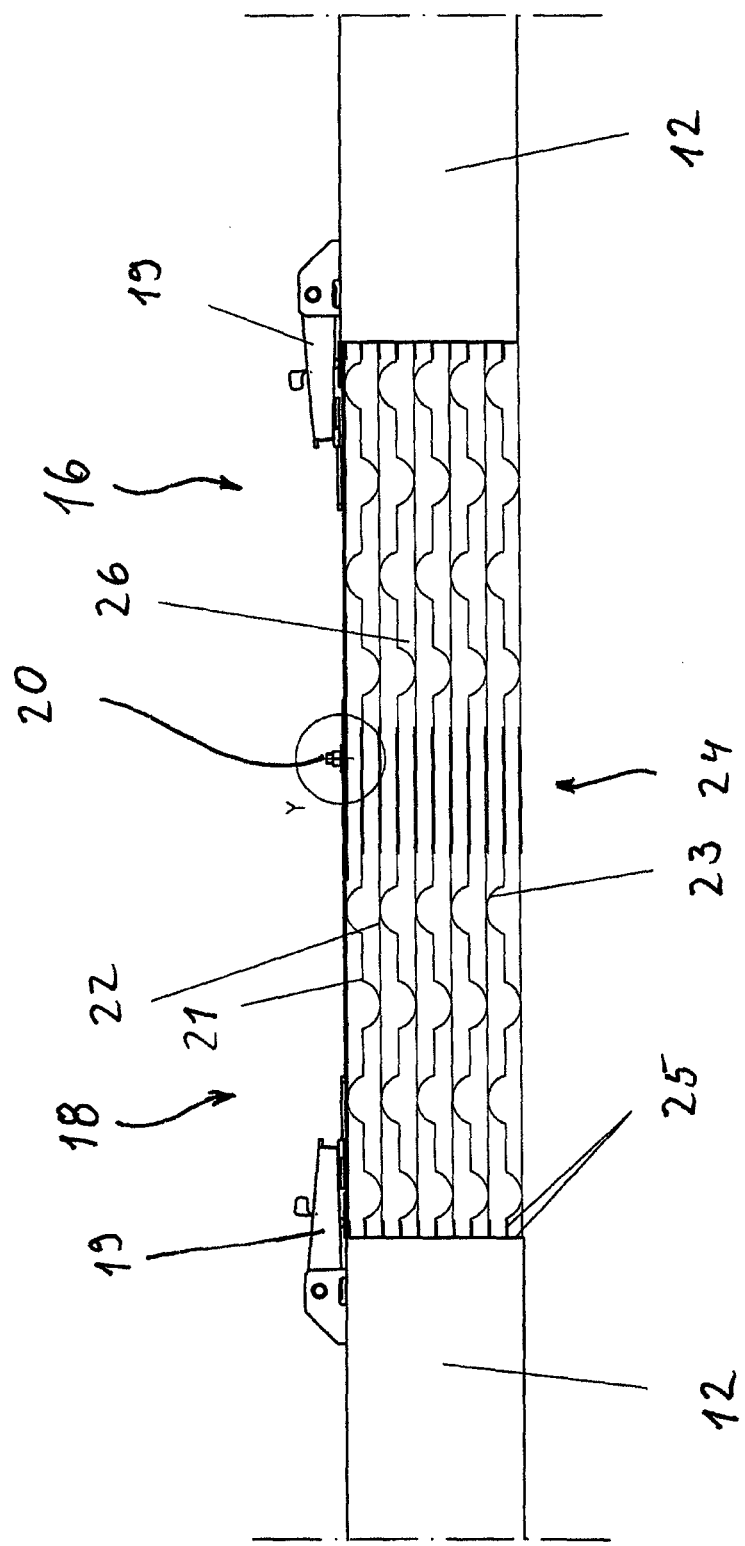
FIG. 2 is sectional view taken at line A-A in FIG. 1.

FIG. 2 shows section A-A from FIG. 1. As can be determined from the figure, the cassette part elements 16, 18 are made similarly from a plurality of layers of flat reflection elements 21, 22. The flat reflection elements are specifically metal foils 21, 22, namely, stainless steel foils in the exemplary embodiment being shown. The metal foils 21 have a plurality of alternatingly arranged knobs 23 and are thus made as a knobbed foil 21. Contrary to this, the metal foils 22 are always flat.

The knobbed foils 21 and the flat foils 22 are arranged alternatingly adjacent to each other in the exemplary embodiment being shown. The foils 21, 22 of the cassette part elements 16, 18 overlap each other in an area 24. As can also be determined from the figure, the foils 21, 22 are welded at their ends facing away from area 24 to a shell of the cassette part elements 16, 18 by means of a plurality of weld spots 25, of which only two weld spots 25 are provided with a reference number in the figure for the sake of greater clarity.

As can also be determined from the figure, the knobs 23 are used to establish a defined air gap 26 between mutually adjacent metal foils 21, 22.

Figure 3:
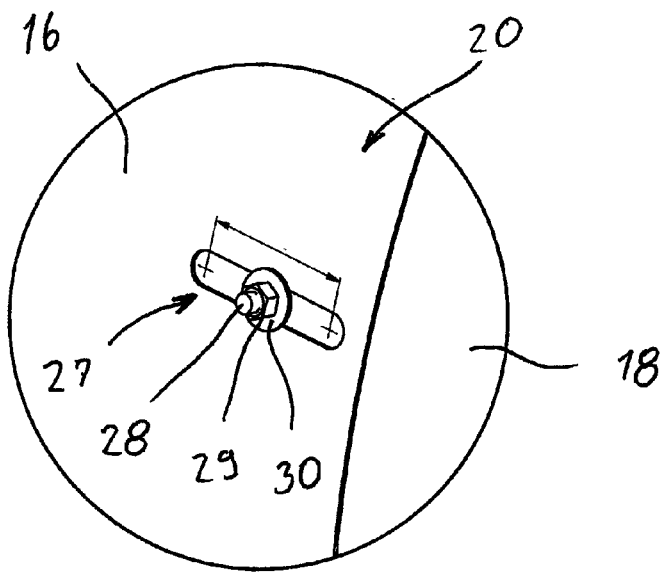
FIG. 3 is a detail view according to detail z in FIG. 1, showing a pushing guide.

FIG. 3 shows a pushing guide 20 according to detail z in FIG. 1. As can be determined from the figure, the pushing guide 20 has an elongated hole 27, in which a bolt 28 is guided displaceably. Bolt 28 is a threaded bolt 28 in the exemplary embodiment being shown, onto which a nut 29 is screwed with a plain washer 30 placed under it.

Figure 4:
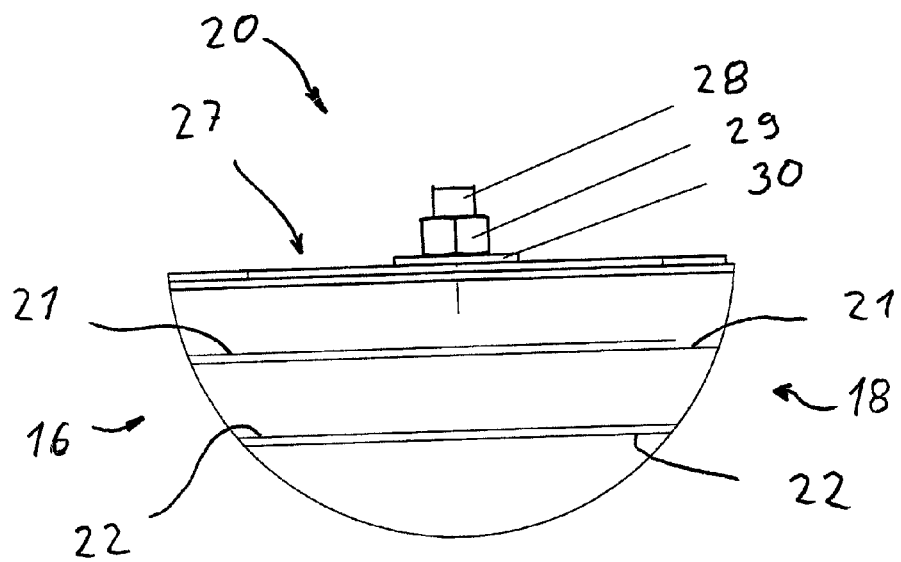
FIG. 4 is a sectional view of the pushing guide according to detail y in FIG. 2.

FIG. 4 shows an enlarged detail view in the area of pushing guide 20 according to detail y in FIG. 2. As can be determined from FIGS. 3 and 4, bolt 28 is rigidly connected to the shell of cassette part element 18 and extends through the elongated hole 27. Bolt 28 is secured against leaving the elongated hole 27 by means of plain washer 30 and nut 29, and nut 29 can be reliably prevented from accidentally separating from the threaded bolt 28 by a weld spot at the connection point between nut 29 and bolt 28. The displacement range of the maximum length adjustment of the insulation cassette 11 due to displacement of the cassette part elements 16, 18 in relation to one another is limited by the length of elongated hole 27, as is indicated by a double arrow in FIG. 3.

Figure 5:
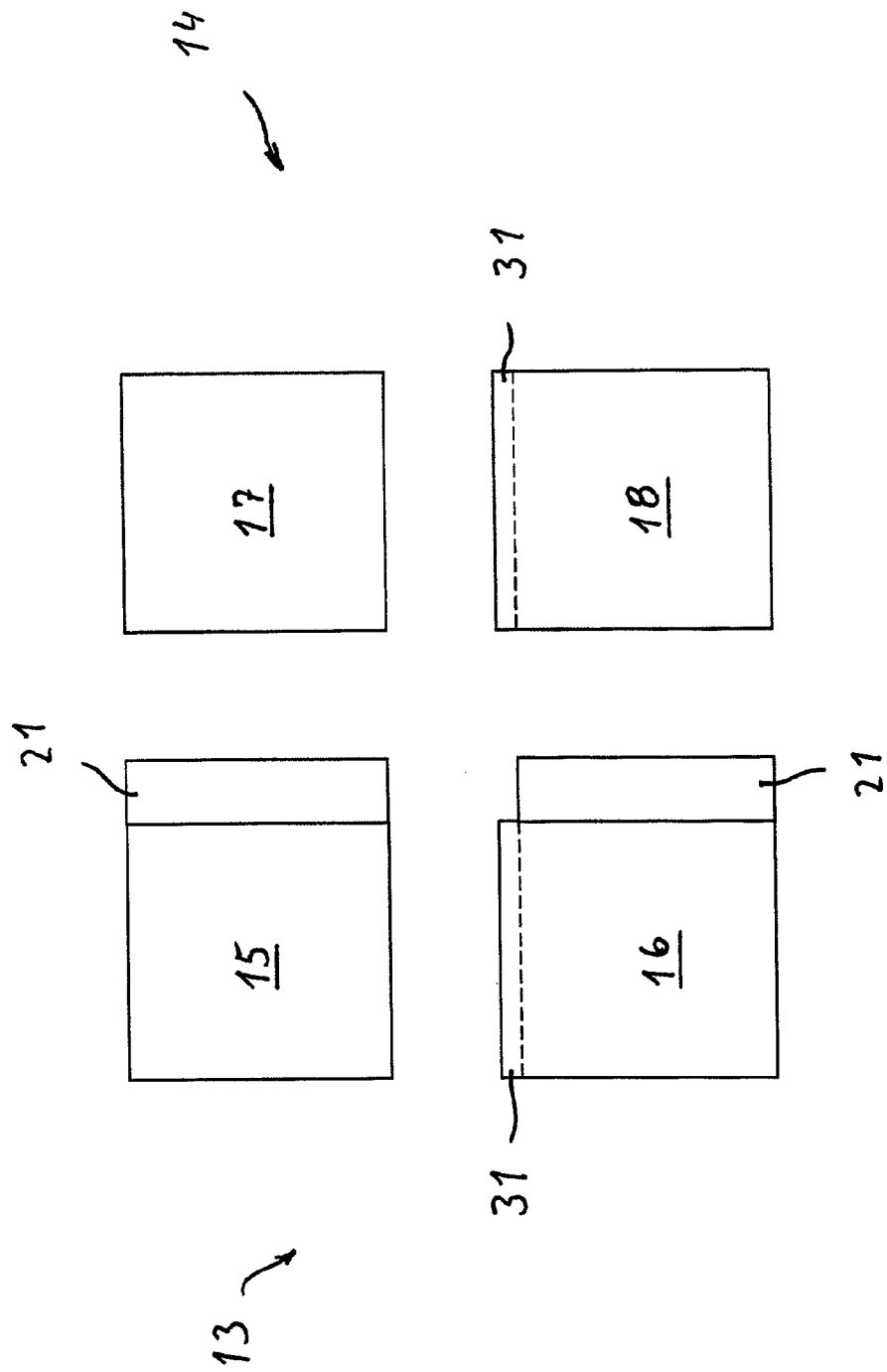
FIG. 5 is a schematic view of the variable-length insulation cassette from FIG. 1 with cassette parts detached from one another.

FIG. 5 shows the cassette part elements 15, 16, 17, 18 in the state in which they are removed from each other in a schematic exploded view. As can be determined from the figure, the knobbed foils 21 protrude from the shell at the cassette part elements 15, 16. It is ensured in this manner that no state is reached in which there is no overlap of the mutually adjacent foils any more in area 24 when the cassette part elements 15, 16 are displaced against the cassette part elements 17, 18. In addition, simpler pushing into the cassette part elements 17, 18 is possible due to the protrusion of the insulating foils 21, 22 over the cassette part elements 15, 16. As can also be determined from the figure, the cassette part elements 16, 18 have folds 31 at their respective ends facing the cassette part elements 15, 17, which folds act as guides for the cassette part elements 15, 17 and, moreover, prevent the formation of a gap between the cassette part elements 15, 17 and the cassette part elements 16, 18.

Figure 6:
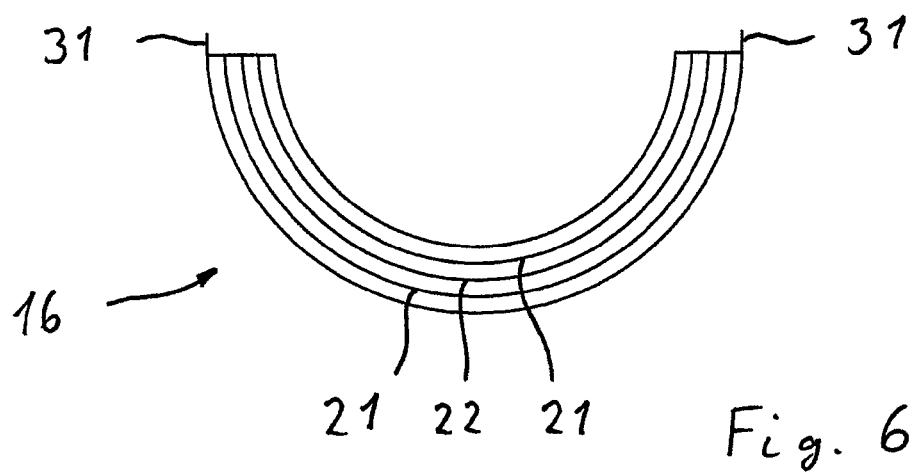
FIG. 6 is a front view of a cassette part from FIG. 5.

FIG. 6 shows a front view of cassette part element 16. Only three metal foils 21, 22 are shown in the figure for the sake of greater clarity. As can be determined from the figure, folds 31 are provided on sides of the cassette part elements 16, which sides are facing away from each other. A cassette part element 15 can thus be arranged during assembly on the cassette part element 16 and held and guided by the folds 31 reliably and securely until fastening the toggle-type fasteners 19. It shall be pointed out here that the use of knobbed foils 21 can be eliminated for small diameters of the insulation cassette 11. A plurality of layers of concentrically arranged metal foils 22 may also be used alone in this case, because the inherent rigidity of the metal foil 22 is sufficient for setting a defined distance between the layers.

Figure 7:
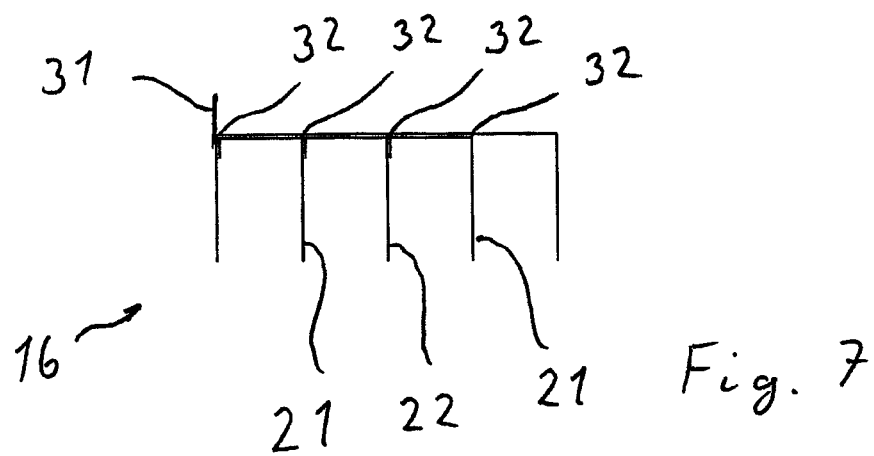
FIG. 7 is an enlarged detail view of the cassette part from FIG. 6.

FIG. 7 shows an enlarged partial view of the connection area of the metal foils 21, 22 with the shell of cassette part element 16. As can be determined from the figure, the metal foils 21, 22 are bent over each in a U-shaped pattern at the connection-side end and connected each to the shell of the cassette part element 16. The ends of the metal foils 21, 22 bent over in a U-shaped manner are used in this manner for secure fastening, on the one hand, and as spacer elements, on the other hand.

The mode of action of the insulation cassette 11 will be explained below on the basis of the figures. As can be determined, for example, from FIG. 2, the individual layers of the metal foils 21, 22 and of the shell are formed in area 24 such that they overlap in layers. In case of a length adjustment with the insulation cassette 11, for example, for adjustment to the desired length during assembly or to compensate thermal expansions, the individual layers of the metal foils 21, 22 of the shell can thus slide on each other. The maximum adjustment is limited by the guiding of bolt 28 in elongated hole 27. The pipeline arranged in the insulation system 10 is accessible for maintenance or repair purposes at any time by means of the toggle-type fasteners 19.

Figure 8:
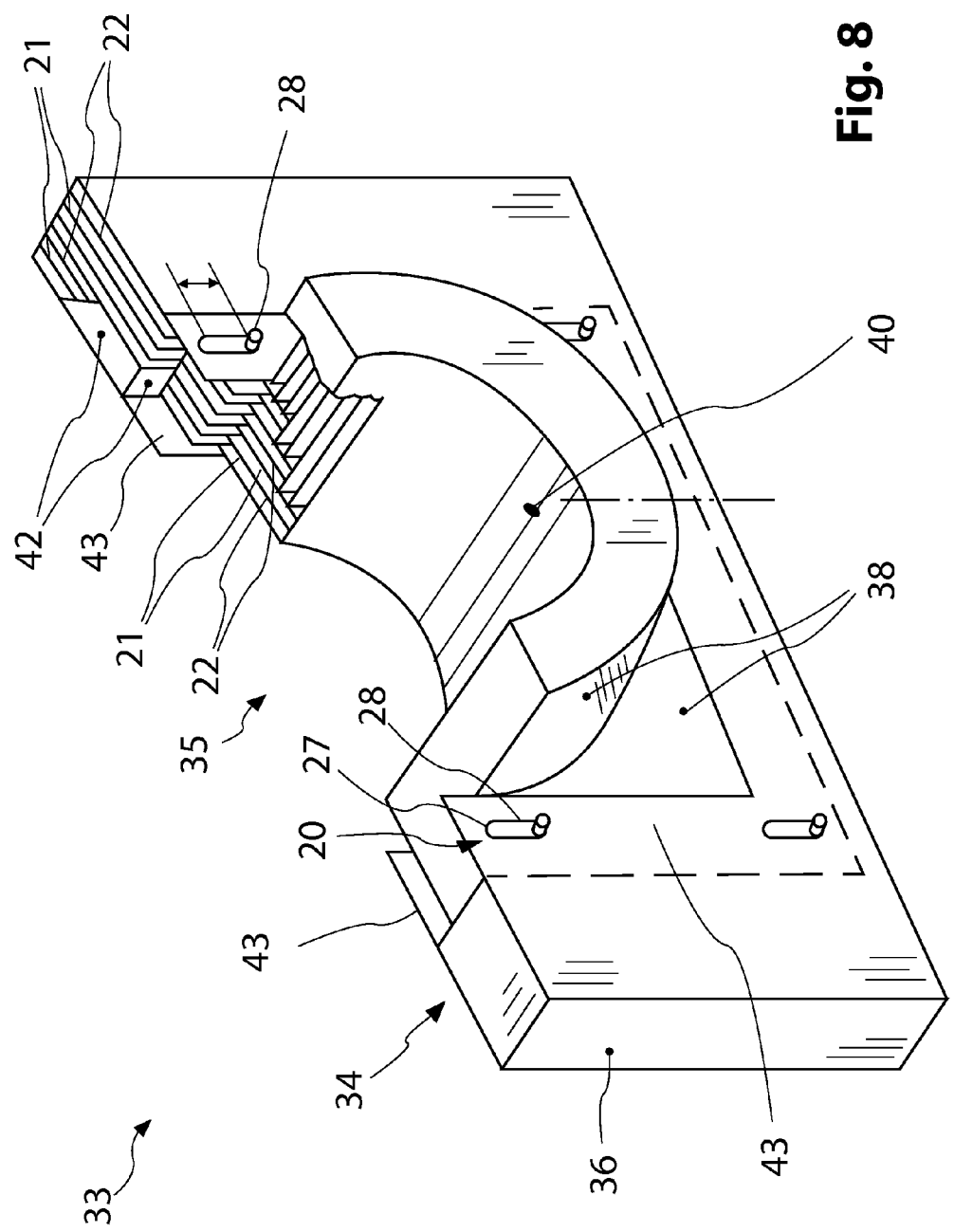
FIG. 8 is a partly cut-away perspective view of an upper part of an insulation cassette as another exemplary embodiment of the present invention.
Figure 9:
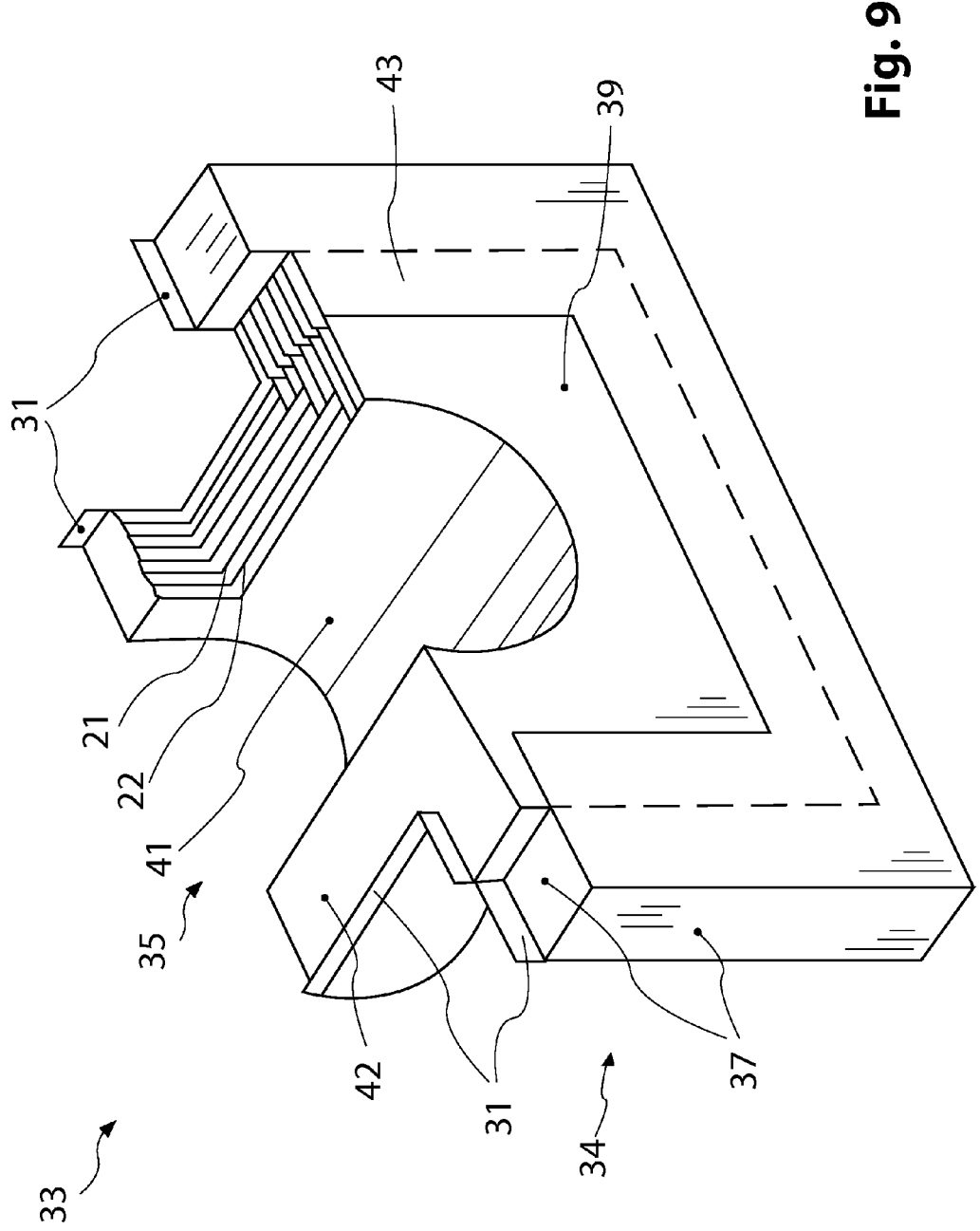
FIG. 9 is a view similar to that in FIG. 8 of a lower part of the insulation cassette.

FIG. 8 shows an upper part of an insulation cassette 33 in a partly cut-away perspective view as another exemplary embodiment of the present invention. FIG. 9 shows a lower part of the insulation cassette 33 in a view similar to that in FIG. 8. Identical elements carry the same reference numbers as in insulation cassette 11.

As can be determined from the figures, insulation cassette 33 has a first cassette part 34 and a second cassette part 35. The design of the cassette parts 34, 35 corresponds essentially to that of the cassette parts 13, 14. The first cassette part 34 has two cassette elements 36, 37 and the second cassette part 35 has two cassette elements 38, 39. Cassette elements 38, 39 have mounts 40, 41 each, which together form a mount for a branch of a pipeline in the mounted state.

Cassette elements 36, 37 have a shell 42 each, which envelope the flat reflection elements, namely, the metal foils 21, 22. In addition, the cassette elements 36, 37 have projections 43 adjoining the shell and adjacent to the cassette elements 38, 39. Pushing guides 20, which have the components already explained above and have the mode of action already explained above, are arranged in the area of the projections 43. Pushing guides 20 are likewise arranged between the cassette elements 37, 39, but these pushing guides cannot be seen in FIG. 9. Furthermore, the cassette elements 37, 39 also have folds 31, which face the cassette elements 36, 38 and are adjacent to same in the mounted state.

The two parts of insulation cassette 33 are placed on one another in the area of the branch during assembly such that the mounts 40, 41 of the cassette elements 38, 39 together form a mount for mounting the branching pipe section. The folds 31 and the projections 43 each form a guide to facilitate the insertion of cassette element 39 into cassette element 36. Because of the pushing guides, the dimensions of the insulation cassette do not have to be exactly coordinated with the position of the branch. Rather, it is sufficient if dimensional stability is given to the extent that the deviations are in the range of which can be compensated with pushing guide 20.

Changes in the length of the main pipe or container, from which a pipe branches off, which changes occur during the operation due to temperature changes, can be compensated with the pushing guide in the manner explained above. Mutually adjacent metal foils 21, 22 can slide on one another in the area of their overlap, and thus likewise permit a length compensation, without weak points developing in the insulation.

While specific embodiments of the invention have been shown and described in detail to illustrate the application of the principles of the invention, it will be understood that the invention may be embodied otherwise without departing from such principles.

APPENDIX

List of Reference Numbers

| | |
|---|---|
| 10 | Insulation system |
| 11 | Insulation cassette |
| 12 | Insulation cassette |
| 13 | First cassette part |
| 14 | Second cassette part |
| 15 | Cassette part element |
| 16 | Cassette part element |
| 17 | Cassette part element |
| 18 | Cassette part element |
| 19 | Toggle-type fastener |
| 20 | Pushing guide |
| 21 | Knobbed foil |
| 22 | Foil |
| 23 | Knob |
| 24 | Area |
| 25 | Weld spot |

| | |
|---|---|
| 26 | Air gap |
| 27 | Elongated hole |
| 28 | Bolt |
| 29 | Nut |
| 30 | Plain washer |
| 31 | Fold |
| 32 | Weld spot |
| 33 | Insulation cassette |
| 33 | Insulation cassette |
| 34 | First cassette part |
| 35 | Second cassette part |
| 36 | Cassette element |
| 37 | Cassette element |
| 38 | Cassette element |
| 39 | Cassette element |
| 40 | Mount |
| 41 | Mount |
| 42 | Projection |

What is claimed is:

1. An insulation cassette for the heat insulation of elongated elements, the insulation cassette comprising:
   a first cassette part;
   a second cassette part;
   a multilayer insulation comprising layers of insulation wherein each layer comprises at least two flat reflection elements, which overlap at least partly at ends facing each other; and
   a plurality of pushing guides arranged in an overlapping area between said first cassette part and said second cassette part, said pushing guides having an elongated hole in which a bolt is guided displaceably, said bolt being rigidly connected to an outer shell of said second cassette part and said bolt extending, in an outward direction, from said outer shell of said second cassette part, said bolt extending exclusively through the elongated hole associated with said first cassette part, whereby said elongated hole is arranged within an outer shell of said first cassette part.

2. An insulation cassette in accordance with claim 1, wherein said flat reflection elements comprise metal foils formed of at least one of stainless steel, vanadium steel and austenitic steel.

3. An insulation cassette in accordance with claim 1, wherein said flat reflection elements are arranged concentrically with a distance between the reflective elements of 4 mm to 15 mm.

4. An insulation cassette in accordance with claim 1, wherein at least some of said flat reflection elements have spacer knobs on both sides of said at least some of said reflection elements.

5. An insulation cassette in accordance with claim 4, wherein said reflection elements with spacer knobs and reflection elements without spacer knobs are arranged alternatingly with each other.

6. An insulation cassette in accordance with claim 1, wherein said first cassette part and said second cassette part each comprises said outer shell, which has a plurality of shell parts, wherein shell parts are located one or more of adjacent to one another axially and tangentially are axially and tangentially displacable in relation to one another by means of said pushing guides.

7. An insulation cassette in accordance with claim 6, wherein said shell parts have quick-acting closures comprising toggle-type fasteners, for connecting said shell parts to one or more of another insulation cassettes, axially adjacent insulation cassettes and tangentially adjacent insulation cassettes.

8. An insulation cassette in accordance with claim 1, wherein said second cassette part has a mount for a branch of a pipeline system.

9. An insulation cassette in accordance with claim 1, wherein one or more of said first cassette part and said second cassette part have one or more of a projection and a fold on said outer shell for guiding the other of said one or more of said first cassette part and said second cassette part.

10. An insulation cassette in accordance with claim 9, wherein one or more of said projection and said fold has a height that corresponds to about half a guide length of said pushing guide and is especially slightly greater.

11. An insulation cassette in accordance with claim 1, wherein said bolt extends from said shell of said second cassette part outwards through said elongated hole associated with said first cassette part, said elongated hole being assigned to a shell of said first cassette part.

12. An insulation cassette in accordance with claim 1, wherein said first cassette part comprises a first cassette part shell, said first cassette part shell comprising said elongated hole.

13. An insulation cassette in accordance with claim 1, wherein each of said layers of insulation extends continuously, without interruption in an interior space defined by one or more of said first cassette part and said second cassette part.

14. An insulation cassette in accordance with claim 1, wherein said bolt does not extend through each of said layers of insulation.

15. A method to compensate changes in length because of thermal effects, the method comprising the steps:
   providing an insulation cassette for the heat insulation of elongated elements, the insulation cassette comprising a first cassette part, a second cassette part, a multilayer insulation comprising layers of insulation wherein each layer comprises at least two flat reflection elements, which overlap at least partly at ends facing each other and a plurality of pushing guides arranged in an overlapping area between said first cassette part and said second cassette part, said pushing guides having an elongated hole in which a bolt is guided displaceably, said bolt being rigidly connected to an outer shell of said second cassette part and extending, in an outward direction, exclusively from said outer shell through the elongated hole associated with said first cassette part to a position located beyond said first cassette part; and
   compensating for changes in length of an article because of thermal effects by using the insulation cassette as one or more of a compensating element to compensate changes in length of the article because of thermal effects and an adapter for variable length adjustment during assembly.

16. A method in accordance with claim 15, wherein each of said layers of insulation extends continuously, without interruption in an interior space defined by one or more of said first cassette part and said second cassette part.

17. A method in accordance with claim 15, wherein said bolt is located at a spaced location from each of said layers of insulation, said bolt being located at a spaced location from an interior of said second cassette part.

18. A method to insulate pipelines, the method comprising the steps:
   providing an insulation cassette for the heat insulation of elongated elements, the insulation cassette comprising a first cassette part, a second cassette part, a multilayer insulation comprising layers of insulation wherein each layer comprises at least two flat reflection elements, which overlap at least partly at ends facing each other and a plurality of pushing guides arranged in an overlapping area between said first cassette part and said second cassette part, said pushing guides having an elongated hole in which a bolt is guided displaceably, said bolt being rigidly connected to an outer shell of said second cassette part and only extending from said outer shell through the elongated hole defined in an outer shell of said first cassette part to a position located outside of said first cassette part;

insulating cooling water pipes of nuclear power plants, in the area of branches with the insulation cassette.

19. A method in accordance with claim 18, wherein said bolt does not extend through each of said layers of insulation.

20. A method in accordance with claim 18, wherein each of said layers of insulation extends continuously, without interruption in an interior space defined by one or more of said first cassette part and said second cassette part.

\* \* \* \* \*